United States Patent
Lai et al.

(10) Patent No.: US 6,956,087 B2
(45) Date of Patent: Oct. 18, 2005

(54) HIGH REFRACTIVE INDEX POLYSILOXANE PREPOLYMERS

(75) Inventors: Yu-Chin Lai, Pittsford, NY (US); Edmond T. Quinn, Rochester, NY (US); Xiaojun Michael Liu, Pittsford, NY (US); Edmund P. Maziarz, III, Brockport, NY (US)

(73) Assignee: Bausch & Lomb Incorporated, Rochester, NY (US)

( * ) Notice: Subject to any disclaimer, the term of this patent is extended or adjusted under 35 U.S.C. 154(b) by 4 days.

(21) Appl. No.: 10/319,131

(22) Filed: Dec. 13, 2002

(65) Prior Publication Data

US 2004/0116593 A1 Jun. 17, 2004

(51) Int. Cl.$^7$ .................. C08G 77/06; C08G 77/20; B21D 11/00; G02C 7/02
(52) U.S. Cl. .............. 525/478; 264/1.32; 351/159; 351/167; 524/267; 524/268; 524/588; 528/15; 528/20; 528/22; 528/31; 528/32; 528/43
(58) Field of Search ................. 524/267, 268, 524/588; 525/478; 264/1.32; 351/159; 528/167, 15, 20, 22, 31, 32, 43

(56) References Cited

U.S. PATENT DOCUMENTS

| | | | | |
|---|---|---|---|---|
| 3,996,187 A | | 12/1976 | Travnicek | 260/37 |
| 3,996,189 A | | 12/1976 | Travnicek | 260/37 |
| 4,077,943 A | * | 3/1978 | Sato et al. | 528/15 |
| 4,154,714 A | * | 5/1979 | Hockemeyer et al. | 524/268 |
| 4,304,895 A | * | 12/1981 | Loshaek | 526/313 |
| 4,380,367 A | * | 4/1983 | Suzuki | 385/141 |
| 4,418,165 A | | 11/1983 | Polmanteer et al. | 523/210 |
| 4,647,282 A | | 3/1987 | Fedorov et al. | 623/4 |
| 4,868,251 A | | 9/1989 | Reich et al. | 525/479 |
| 5,147,396 A | * | 9/1992 | Kageyama et al. | 623/6.61 |
| 5,444,106 A | * | 8/1995 | Zhou et al. | 523/107 |
| 5,512,609 A | | 4/1996 | Yang | 523/107 |
| 5,623,029 A | | 4/1997 | Yang | 525/478 |
| 6,121,368 A | * | 9/2000 | Heying et al. | 524/493 |
| 6,415,093 B1 | * | 7/2002 | Nakamura et al. | 385/141 |
| 6,483,981 B1 | * | 11/2002 | Krahn et al. | 385/140 |
| 2002/0074086 A1 | * | 6/2002 | Nakamura et al. | 156/329 |

FOREIGN PATENT DOCUMENTS

| | | |
|---|---|---|
| EP | 0 335 312 A | 4/1989 |
| EP | 0 492 126 A | 1/1992 |
| WO | WO 93/21245 | 10/1993 |

* cited by examiner

*Primary Examiner*—Jeffrey B. Robertson
(74) *Attorney, Agent, or Firm*—Toan P. Vo

(57) ABSTRACT

A process for producing polysiloxane prepolymers of improved homogeneity for use in the production of relatively high refractive index polymeric compositions is described herein. Polymeric compositions so produced are useful in the production of ophthalmic devices such as for example intraocular lenses and corneal inlays.

5 Claims, No Drawings

HIGH REFRACTIVE INDEX POLYSILOXANE PREPOLYMERS

FIELD OF THE INVENTION

The present invention relates to high refractive index polysiloxane prepolymers useful in the manufacture of biocompatible medical devices such as intraocular lenses. More particularly, the present invention relates to high refractive index polysiloxane prepolymers having both alkylaromatic siloxane and dialkylsiloxane units, useful in the manufacture of ophthalmic devices.

BACKGROUND OF THE INVENTION

Since the 1940's optical devices in the form of intraocular lens (IOL) implants have been utilized as replacements for diseased or damaged natural ocular lenses. In most cases, an intraocular lens is implanted within an eye at the time of surgically removing the diseased or damaged natural lens, such as for example, in the case of cataracts. For decades, the preferred material for fabricating such intraocular lens implants was poly(methyl methacrylate), which is a rigid, glassy polymer.

Softer, more flexible IOL implants have gained in popularity in more recent years due to their ability to be compressed, folded, rolled or otherwise deformed. Such softer IOL implants may be deformed prior to insertion thereof through an incision in the cornea of an eye. Following insertion of the IOL in an eye, the IOL returns to its original pre-deformed shape due to the memory characteristics of the soft material. Softer, more flexible IOL implants as just described may be implanted into an eye through an incision that is much smaller, i.e., less than 4.0 mm, than that necessary for more rigid IOLs, i.e., 5.5 to 7.0 mm. A larger incision is necessary for more rigid IOL implants because the lens must be inserted through an incision in the cornea slightly larger than the diameter of the inflexible IOL optic portion. Accordingly, more rigid IOL implants have become less popular in the market since larger incisions have been found to be associated with an increased incidence of postoperative complications, such as induced astigmatism.

With recent advances in small-incision cataract surgery, increased emphasis has been placed on developing soft, foldable materials suitable for use in artificial IOL implants. One such suitable class of soft, foldable materials is silicone elastomers fabricated through the polymerization of divinyl-end capped poly(dialkyl)-co-(diaromatic substituted) siloxane with polysiloxanes having multiple hydrosilane groups. This silicone elastomer producing polymerization reaction is achieved under thermal conditions using a platinum catalyst. A component added to the described siloxane and polysiloxanes prior to initiation of the polymerization reaction, is a reinforcing agent to enhance the mechanical properties of the silicone elastomer end product so fabricated. Examples of suitable reinforcing agents include silica filler or an organosilicon reinforcing resin such as siloxane-based resin with at least one vinyl functional group.

The prepolymer, divinyl-end capped poly (dialkyl)-co-(diaromatic substituted) siloxane used in the polymerization reaction described above, is prepared by reacting a 1,3-bisvinyl tetraalkyldisiloxane, a mixture of octamethylcyclotetrasiloxane and an all aromatic group-containing cyclosiloxane, especially octaphenylcyclo-tetrasiloxane. Using an amine or a potassium silanoate as a catalyst, the reaction used to prepare the noted prepolymer is carried out at 40–100° C. in neat or in an organic solvent. This polymerization reaction only reaches an equilibrium with some cyclics, either those of the original components or those regenerated from the growing polymer, which then remain as side products. The resulting product was purified using a high temperature, high vacuum, thin film evaporator to remove solvent and volatile cyclics. Because of the poor solubility of the aromatic cyclics, incorporating a quantitative amount of the all-aromatic cyclics into the growing polymer molecule proved difficult. Likewise, due to high melting points (octaphenylcyclosiloxane has melting point of 197–199° C.; boiling point of 332° C./1 mmHg), the aromatic cyclics have no vapor pressures and can not be removed effectively using a thin film evaporator even at extremely high temperature (200° C.). As a result, in most cases, the aromatic cyclics, even though soluble in the compositions before curing, remain as contaminants in the final silicone elastomer product. The presence of aromatic cyclics as contaminants in the final silicone elastomer product creates the potential for defects and possible failures in products produced therefrom.

Because of the noted shortcomings in the quality of divinyl-end capped poly (dialkyl)-co-(diaromatic substituted) siloxane prepolymer using the described known process, there is a need to have an improved process for synthesizing the divinyl-end capped poly (dialkyl)-co-(diaromatic substituted) siloxane prepolymer or replacing the diaromatic substituted moiety in the prepolymer structure while maintaining high refractive index nature of this type of prepolymer.

SUMMARY OF THE INVENTION

Soft, foldable, high refractive index, high elongation, polymeric compositions or silicone elastomers are prepared in accordance with the present invention through a copolymerization process using polysiloxane prepolymers of the present invention. An advantage of using polysiloxane prepolymers of the present invention in the manufacture of medical devices is that the prepolymer compositions produced therefrom may contain pure methylphenylsiloxane cyclics (bp=160–190° C. at 5 mmHg), which can be removed easily under high vacuum application. This improved production process of the present invention using the polysiloxane prepolymers of the present invention eliminates difficulties formerly encountered in the purification of materials useful in the manufacture of medical devices. Following preparation of the polysiloxane prepolymers using the process of the present invention, the prepolymers are copolymerized to form desirable polymeric compositions useful in the manufacture of biocompatible medical devices such as ophthalmic devices. Such desirable polymeric compositions are transparent, relatively high in strength for durability during surgical manipulation, relatively high in elongation, relatively high in refractive index and particularly well suited for use in the manufacture of ophthalmic devices such as intraocular lens (IOL) implants, contact lenses, keratoprostheses, corneal rings, corneal inlays and the like. Medical devices fabricated from the polymeric compositions or silicone elastomers produced using polysiloxane prepolymers prepared in accordance with the present invention are of improved product quality and reliability.

The process of the present invention is used to prepare polysiloxane prepolymers having a structure generally represented by Formula 1 below:

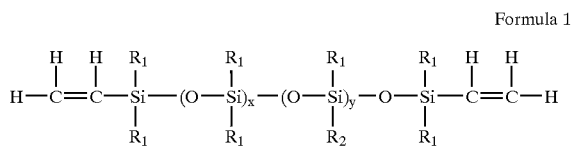

Formula 1 wherein the $R_1$ groups may be the same or different alkyl substituents; the $R_2$ group is an aromatic substituent; and x and y may be the same or different natural numbers so that y/x+y is at least equal to 0.1 and each OSi $(R_1)_2$ and each OSi$(R_1\ R_2)$ are independently and randomly distributed in the prepolymer molecule.

Accordingly, it is an object of the present invention to provide a process for the production of transparent, biocompatible polymeric compositions having desirable physical characteristics and relatively high refractive indices.

Another object of the present invention is to provide a process for the production of polymeric compositions having relatively high refractive indices and good clarity.

Another object of the present invention is to provide a process for the production of polymeric compositions suitable for use in the manufacture of ophthalmic devices.

Another object of the present invention is to provide a process for the production of polymeric compositions suitable for use in the manufacture of intraocular lens implants.

Still another object of the present invention is to provide a process for the production of polymeric compositions that are economical to produce.

These and other objectives and advantages of the present invention, some of which are specifically described and others that are not, will become apparent from the detailed description and claims that follow.

DETAILED DESCRIPTION OF THE INVENTION

The present invention relates to a novel process for the production of polysiloxane prepolymers and the use of such prepolymers to produce biocompatible polymeric compositions having desirable physical properties and relatively high refractive indices for use in the manufacture of ophthalmic devices. The aromatic-substituted polysiloxane prepolymers of the present invention are represented generally by Formula 1 below:

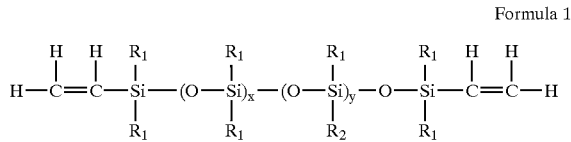

Formula 1 wherein the $R_1$ groups may be the same or different selected from the group consisting of $C_{1-10}$ alkyl substituents such as for example but not limited to methyl, propyl or octyl; $R_2$ is a $C_{6-30}$ aromatic substituent such as for example but not limited to phenyl or naphthyl; and x and y may be the same or different natural numbers so that y/x+y is at least equal to 0.1 and each OSi $(R_1)_2$ and OSi$(R_1\ R_2)$ are independently and randomly distributed in the prepolymer molecule such that the prepolymer molecular weight is at least approximately 1000 and refractive index is at least 1.42.

The polysiloxane prepolymers of Formula 1 above are produced using the process of the present invention by reacting a mixture of cyclics with divinyl-terminated (poly)dimethylsiloxane of the Mn desired or by using 1,3-divinyltetramethydisiloxane. The starting mixture of cyclics is dimethylsiloxane cyclics and methylphenylsiloxane cyclics as described in greater detail in the examples provided below.

By using the mixture of cyclics and divinyl-terminated (poly)dimethylsiloxane in varying molar ratios, the refractive index and molecular weight of the polysiloxane prepolymer may be manipulated to achieve the particular properties desired. As the polymerization of the mixture of cyclics and divinyl-terminated (poly)dimethylsiloxane proceeds, the molecular weight grows until the reaction reaches equilibrium. A polysiloxane prepolymer of Formula 1 with cyclic side products in equilibrium therewith is thus produced. The cyclic side products in equilibrium are pure dimethylsiloxane or methylphenylsiloxane cyclics, as well as cyclics with both dimethylsiloxane and methylphenylsiloxane units. On average, each cyclic molecule has far lower aromatic content. While complicated in structure, the final cyclic side products in equilibrium with the polysiloxane prepolymer are more volatile under high vacuum and thus can be relatively easily separated from or removed from the polysiloxane prepolymer by wipe-film evaporator. As a result, the polysiloxane prepolymers so produced in accordance with the present invention are more homogeneous, without particulates, strings of droplets, or the like. The subject polysiloxane prepolymers are thus superior for use in the production of polymeric compositions for medical devices such as biocompatible ophthalmic devices. Other purification techniques such as preparative size exclusion chromatography (SEC), supercritical fluid (SCF) extraction or other techniques known to those skilled in the art of polymer chemistry can likewise be used in the purification of the subject polysiloxane prepolymers having been prepared in accordance with the process of the present invention.

Soft, foldable, relatively high refractive index of approximately 1.42 or greater, relatively high elongation of approximately 100 percent or greater, polymeric compositions are synthesized using one or more polysiloxane prepolymers produced through the process of the present invention. To produce the subject polymeric compositions, one or more polysiloxane prepolymers produced using the process of the present invention are copolymerized with one or more strengthening agents that are added to enhance the mechanical properties of the polymeric compositions so fabricated, one or more crosslinking agents and one or more catalysts.

Suitable strengthening agents for use in the copolymerization of the polysiloxane prepolymer produced in accordance with the process of the present invention includes but is not limited to silica filler or an organosilicon resin such as for example a Q-resin with multiple vinyl groups.

Suitable crosslinking agents for use in the copolymerization of the polysiloxane prepolymer produced in accordance with the process of the present invention include but are not limited to polydimethyl-co-methylhydrosiloxane.

Suitable catalysts for use in the copolymerization of the polysiloxane prepolymer produced in accordance with the process of the present invention includes but is not limited to Pt-silicone complex.

The polymeric compositions manufactured using polysiloxane prepolymers produced through the process of the present invention have refractive indices of approximately 1.42 or greater, relatively low glass transition temperatures of approximately 30 degrees Celsius or less and relatively high elongations of approximately 100 percent or greater. The polymeric compositions with the desirable physical properties described herein are particularly useful in the manufacture of ophthalmic devices such as but not limited to intraocular lenses (IOLs) and corneal inlays due to the increased homogeneity of the polysiloxane prepolymer.

IOLs having thin optic portions are critical in enabling a surgeon to minimize surgical incision size. Keeping the surgical incision size to a minimum reduces intraoperative trauma and postoperative complications. A thin IOL optic Portion is also critical for accommodating certain anatomical locations in the eye such as the anterior chamber and the ciliary sulcus. IOLs may be placed in the Anterior chamber for increasing visual acuity in both aphakic and phakic eyes and placed in the ciliary sulcus for increasing visual acuity in phakic eyes.

The polymeric compositions produced as described herein have the flexibility required to allow ophthalmic devices manufactured from the same to be folded or deformed for insertion into an eye through the smallest possible surgical incision, i.e., 3.5 mm or smaller. It is unexpected that the subject polymeric compositions described herein could possess the ideal physical properties disclosed herein. The ideal physical properties of the subject polymeric compositions are unexpected because high refractive index monomers or copolymers typically lend to polymers that have increased crystallinity and decreased clarity, which does not hold true in the case of the subject polymeric compositions.

One or more suitable ultraviolet light absorbers may optionally be used in the manufacture of the subject polymeric compositions. Such ultraviolet light absorbers include for example but are not limited to 2-[3'-tert-butyl-5'-(3"-dimethylvinylsilylpropoxy)-2'-hydroxyphenyl]-5-methoxybenzotriazole or 2-(3'-allyl-2'-hydroxy-5'-methylphenyl)benztriazole.

The polymeric compositions made from polysiloxane prepolymers produced in accordance with the process of the present invention, having refractive indices of approximately 1.42 or greater and elongation of 100 percent or greater, are described in still greater detail in the examples that follow.

EXAMPLE 1

Preparation of Vinyl-Terminated Polydimethylsiloxane of Low Molecular Weight

A 3-neck, 500 mL round bottom flask connected with a reflux condenser and nitrogen inlet tube, was charged with 1,1,3,3,5,5,7,7-octamethyltetrasiloxane (43.73 g), 1,3-divinyltetramethyldisiloxane (1.39 g) and aminosilanoate (0.48 g), all from Gelest, Inc., Tullytown, Pa. The contents were stirred under nitrogen and heated with an oil bath at 80 to 90° C. After 16 hours, the contents were heated to 140° C. to decompose the amine catalyst to yield 23.9 g of product. SEC gave Mn of 8,600 Da and Mw of 13,300 Da.

EXAMPLE 2

Preparation of Vinyl-Terminated Polydimethylsiloxane-co-Methylphenylsiloxane with a Total of 10 Percent Phenyl A 3-neck 500 mL round bottom flask connected with a reflux condenser and nitrogen inlet tube, was charged with 1,1,3,3,5,5,7,7-octamethyltetrasiloxane (29.98 g, 0.1043 mole), vinyl-terminated polydimethylsiloxane from Example 1 (4.51 g), 1,3,5,7-tetramethyl-1,3,5,7-tetraphenyltetrasiloxane (15.48 g, 0.0285 mole) and 40 mL of toluene. The contents were heated under nitrogen at 90° C. to distill off 12 mL of azeotrope with any water contaminant. Then 0.42 g of amine silanoate was added and the contents were heated for three hours under nitrogen blanket. After the heating, the reaction product mixture was added to 200 mL of ether and extracted twice with 30 mL of 0.05 N HCl, and then extracted twice with 20 mL of 0.05 N sodium bicarbonate. After removal of solvent, the product (45 g) was found to have Mn of 28,000 Da, Mw of 74,400 Da by SEC. The product had 26 percent by weight of cyclics. The product was optically clear, with no string of bubbles/droplets when observed under microscope. The product had a refractive index of 1.4489.

EXAMPLE 3

Preparation of Vinyl-Terminated Polydimethylsiloxane-co-Methylphenylsiloxane with a Total of 10 Percent Phenyl The preparation was repeated using the same procedure as that described above in Example 2 except that the contents were refluxed for 16 hours instead of three hours. The final product had an Mn of 30,100 Da, Mw of 96,300 Da and had 21.5 percent of cyclics.

EXAMPLE 4

Formulation Studies and Film Casting Using Product from Example 2

Into a glass vial was charged with 1.4012 g of divinyl-terminated polydimethylsiloxane-co-methylphenylsiloxane of Example 2 as the prepolymer, 0.4213 g of tris norbornenyl isobutyl POSS from Hybrid Plastics, Fountain Valley, Calif., (catalog NB 1070) as the strengthening agent, 0.1993 g of polydimethyl-comethylhydrosiloxane 50/50 from Gelest, Inc., (catalog HMS 501) as the crosslinker and 0.0135 9 of Pt-silicone complex as the catalyst. The complex is a mixture of 1 part of Pt/cyclomethylvinylsiloxane complex with 3 percent Pt and 10 parts of 1,3-divinyltetramethyldisiloxane. The mixture was quickly stirred manually for 3 minutes and then pulled under vacuum in a desiccator for 15 minutes to remove bubbles. Then, the bubble-free mix was poured onto a silane-treated glass plate and cured in an oven at 80° C. The mix was found cured in 5 minutes. The film was optically clear, but somewhat fragile.

EXAMPLE 5

Preparation of Divinyl-Terminated Polydimethylsiloxane under an Alternate Reaction Condition as Compared to that of Example 1

A 3-neck, 500 mL round bottom flask connected with a reflux condenser and nitrogen inlet tube, was charged with 1,1,3,3,5,5,7,7-octamethyltetrasiloxane (87.46 g, 0.295 mole) dried with molecular sieve, 1,3-divinyltetramethyldisiloxane (2.78 g, 0.0149 mole) and triflic acid (133 microliter, or 0.25 wt %). The contents were stirred under nitrogen for 16 hours. To the contents was then added 200 mL of ether. The contents was then washed with 100 mL of 0.05 N of sodium hydroxide and then with 100 mL of water to bring the pH to 7.0. The contents were then dried with magnesium sulfate and filtered. The ether solution was vacuum stripped at room temperature to give product. By SEC, the final product had Mn 7,400 of Da and Mw 14,300 Da. The product had 25% cyclics.

EXAMPLE 6

Preparation of High Molecular Weight Polydimethylsiloxane-co-Methylphenvisiloxane A 3-neck, 500 mL round bottom flask connected with a reflux condenser and nitrogen inlet tube, was charged with 1,1,3,3,5,5,7,7-octamethyltetrasiloxane (77.5 g), vinyl-terminated polydimethylsiloxane from Example 5 (4.02 g), 1,3,5,-trimethyl,-1,3,5-triphenyltetrasiloxane (19.34 g) and potassium silanoate (0.0156 g). The contents were mechanically stirred under nitrogen blanket at 160° C. After several hours, no apparent increase in viscosity was found. The contents were then purged under nitrogen for 3 minutes to blow off any water vapor. The reaction mixture then became viscous and IR spectrum of intermediate indicated an increase in Si—O-linear polysiloxane bonds indicating an increase in molecular weight of the product. Stirring was continued over night at 160° C. under nitrogen blanket. The reaction mixture was then cooled down and poured with dry ice to neutralize the catalyst. The product was dissolved in dichlormethane and then filtered. The solution was vacuum stripped first with rotavapor at 40° C., then under vacuum pump (0.2 mmHg) at 120° C. to give the final polymer product. Product yields 76 g. SEC for sample before vacuum stripping at high temperature was Mn 75,800 Da, Mw 177,600 Da with cyclics 18.3%. SEC for the final purified product was Mn of 80,000 Da, Mw of 193,900 Da with cyclics 4.5%. Low cyclics percentage indicates the product was very pure and that most cyclics can be removed easily under vacuum. The product was optically clear. When observed under microscope, there was no string of bubbles or droplets. Refractive index was determined to be 1.432.

EXAMPLE 7

Observation of Mixes of Divinyl-Terminated Polydimethyl-co-Diphenylsiloxane and Anorganosilicon Resin Two lots of mixes derived from different lots of divinyl-terminated polydimethyl-co-diphenylsiloxane and the same lots of organosilicon resins were used in the production of silicone IOL. These two lots of prepolymers were made in the same manner using diphenylsiloxane cyclics as one reacting ingredient. Lenses fabricated from one lot of mix were perfect, while lenses fabricated from the other lot of mix was full of strings of droplet-like bubbles when examined under microscope. When the two mixes from which the lenses were made were examined, it was found that the mix that produced lenses with droplets also had droplets in the mix itself. This indicated that even though the two prepolymer mixes were made in the same manner, they may result in product with different droplet-like defects caused by the presence of diphenylsiloxane cyclics.

EXAMPLE 8

Purification of Prepolymer with a Wipe-Film Evaporator

Product from Example 6 is purified by using a Wipe-film evaporator at 100° C. at pressure less than 0.02 mmHg. SEC gives traces with no cyclics remaining.

EXAMPLE 9

Formulation Studies and Film Casting Usinq Product from Example 6

The same formulation and film casting was conducted as that described in Example 4 above, using the same weight ratios of prepolymer/strengthening agent/crosslinker, except that the prepolymer from Example 2 was replaced by the prepolymer from Example 6. The same concentration of catalyst complex was used. The monomer mix was handled in the same manner and cured under the exact same conditions. The cast elastomeric film was very clear, soft and much tougher as compared to that prepared in Example 4.

EXAMPLE 10

Formulation Studies with Mixed Prepolymers

A monomer mix consisted of 0.7137 g of the prepolymer of Example 6, 0.7156 g of divinyl-terminated polydimethyl-co-diphenylsiloxane with 5 mole % of phenyl from Gelest Inc., (Catalog PDV541), with MW 60,000 and refractive index of 1.43, 0.7156 g of trisnorbornenylisobutyl POSS, 0.2002 g of HMS501 and 0.0113 g of pt-complex as described in Example 4. After the same stirring and vacuum stripping to remove bubbles, the mix was cast on silane-treated glass plate and cured at 75° C. for 100 minutes to give a very clear, soft, tough film.

EXAMPLE 11

Formulation Studies with a Siloxane-Based Q-Resin as a Reinforcing Agent

A monomer mix consisting of 1.400 g of the prepolymer of Example 6, 1.12 g of a vinyl Q resin dispersion in Xylene (Gelest Inc, Tulleytown, Pa., Catalog VQX-221) was vacuum stripped using a wipe-film evaporator at 100° C. at 0.02 mmHg. Then it was added to 0.2 g of crosslinker HMS501 and 0.0113 g of Pt-complex as described in Example 4. After stirring and vacuum stripping the same to remove bubbles, the mix was cast on a silane-treated glass plate and was cured at 75° C. for 100 minutes to give a very clear, soft, tough film.

EXAMPLE 12

Preparation of Polydimethylsiloxane-co-Methylphenylsiloxane of Higher Refractive Index A prepolymer with about 10 mole % total phenyl content was prepared in the similar fashion as that of Example 6. Refractive index measured was 1.4567

Medical devices produced using polymeric compositions or silicone elastomers produced using the process of the present invention may be manufactured in accordance with methods known to those skilled in the art of the specific ophthalmic device being produced. For example, if an intraocular lens is to be produced, the same may be manufactured by methods known to those skilled in the art of intraocular lens production.

Ophthalmic devices such as but not limited to IOLs and corneal inlays manufactured using polymeric compositions produced using the process of the present invention can be of any design capable of being rolled or folded for implantation through a relatively small surgical incision, i.e., 3.5 mm or less. For example, intraocular implants such as IOLs comprise an optic portion and one or more haptic portions. The optic portion reflects light onto the retina and the permanently attached haptic portions hold the optic portion in proper alignment within an eye following implantation. The haptic portions may be integrally formed with the optic portion in a one-piece design or attached by staking, adhesives or other methods known to those skilled in the art in a multipiece design.

The subject ophthalmic devices, such as for example IOLs, may be manufactured to have an optic portion and haptic portions made of the same or differing materials. Preferably, in accordance with the present invention, both, the optic portion and the haptic portions of the IOLs are made of the same polymeric composition produced using the process of the present invention. Alternatively however, the IOL optic portion and haptic portions may be manufactured from different materials and/or different formulations of polymeric compositions produced using the process of the present invention, such as described in detail in U.S. Pat. Nos. 5,217,491 and 5,326,506, each incorporated herein in their entirety by reference. Once the material(s) are selected, the same may be cast in molds of the desired shape, cured and removed from the molds. After such molding, the IOLs are then cleaned, polished, packaged and sterilized by customary methods known to those skilled in the art. Alternatively, rather than molding, the IOLs may be manufactured by casting said polymeric composition in the form of a rod; lathing or machining said rod into disks; and lathing or machining said disks into an ophthalmic device prior to cleaning, polishing, packaging and sterilizing the same.

In addition to IOLs, polymeric compositions produced using the process of the present invention are also suitable for use in the production of other ophthalmic devices such as contact lenses, keratoprostheses, capsular bag extension rings, corneal inlays, corneal rings and like devices.

Ophthalmic devices manufactured using polymeric compositions produced using the process of the present invention are used as customary in the field of ophthalmology. For example, in a surgical cataract procedure, an incision is placed in the cornea of an eye. Through the corneal incision the cataractous natural lens of the eye is removed (aphakic application) and an IOL is inserted into the anterior chamber, posterior chamber or lens capsule of the eye prior to closing the incision. However, the subject ophthalmic devices may likewise be used in accordance with other surgical procedures known to those skilled in the field of ophthalmology.

While there is shown and described herein a process for producing polysiloxane prepolymers, and polymeric compositions and ophthalmic devices made from the subject polysiloxane prepolymers, it will be manifest to those skilled in the art that various modifications may be made without departing from the spirit and scope of the underlying inventive concept and that the same is not limited to particular processes and structures herein shown and described except insofar as indicated by the scope of the appended claims.

We claim:

1. A process for producing a material comprising a polysiloxane prepolymer of

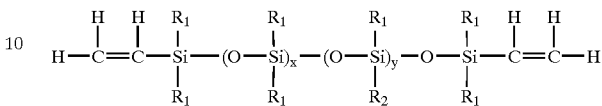

wherein the $R_1$ groups may be the same or different selected from the group consisting of $C_{1-10}$ alkyl substituents; $R_2$ is a $C_{6-30}$ aromatic substituent; and x and y may be the same or different natural number with y/x+y at least equal to 0.1, said process comprising:

polymerizing divinyl-terminated (poly)(dialkylsiloxane) and alkylarylsiloxane cyclics to produce said material.

2. The process of claim 1, further comprising copolymerizing said prepolymer with a material selected from the group consisting of strengthening agents, crosslinking agents, catalysts, and combinations thereof to produce a polymeric composition.

3. The process of claim 2 wherein said strengthening agents are siloxane-based resins with at least one vinyl group.

4. The method of claim 2, further comprising:

casting said polymeric composition into a shaped body, wherein said shaped body is an ophthalmic device.

5. The method of claim 2, further comprising:

pouring said polymeric composition into a mold;

curing said polymeric composition to produce a cured shaped body; and removing said cured shaped body from said mold, wherein said shaped body is an ophthalmic device.

* * * * *